United States Patent [19]

Klass et al.

[11] 4,208,387

[45] Jun. 17, 1980

[54] REMOVAL OF SULFUR DIOXIDE FROM WASTE GASES

[75] Inventors: Donald L. Klass, Barrington; John R. Conrad, Downers Grove, both of Ill.

[73] Assignee: Institute of Gas Technology, Chicago, Ill.

[21] Appl. No.: 716,160

[22] Filed: Aug. 20, 1976

Related U.S. Application Data

[63] Continuation-in-part of Ser. No. 439,285, Feb. 4, 1974, abandoned.

[51] Int. Cl.$^2$ .............................................. C01B 17/00
[52] U.S. Cl. ..................................... 423/243; 423/539
[58] Field of Search ...................... 423/243, 539; 55/73

[56] References Cited

U.S. PATENT DOCUMENTS

| | | | |
|---|---|---|---|
| 1,783,901 | 12/1930 | Bottoms | 423/243 |
| 3,545,916 | 12/1970 | Deicher et al. | 423/243 X |
| 3,620,674 | 11/1971 | Renault et al. | 423/243 X |

*Primary Examiner*—Delbert E. Gantz
*Assistant Examiner*—Gregory A. Heller
*Attorney, Agent, or Firm*—Jakala, Knechtel, Valentino, Demeur & Dallas

[57] ABSTRACT

Sulfur dioxide is removed from waste gases such as stack gases by contacting the gas stream with free tertiary amines having basic strengths greater than about pK 5 to form a coordinate covalent complex of the amine and the sulfur dioxide. The sufficiently stable complex is than thermally regenerated to liberate the sulfur dioxide in one stream, to provide the residual gases in another stream, and to provide the regenerated tertiary amine for collection and reuse in a subsequent sulfur dioxide cleanup step. The coordinate covalent complex reacts with even very small concentrations of sulfur dioxide to effectively reduce the sulfur dioxide to detectable zero levels. The presence of carbon dioxide in waste gas streams does not interfere with the efficient cleanup because the selected tertiary amine does not react with the carbon dioxide.

3 Claims, No Drawings

REMOVAL OF SULFUR DIOXIDE FROM WASTE GASES

This application is a continuation-in-part of Ser. No. 439,285, filed Feb. 4, 1974, now abandoned.

This invention relates to a method for removing sulfur dioxide from waste gases; and particularly relates to a method for removing sulfur dioxide from combustion waste gases by forming stable coordinate covalent complexes of the sulfur dioxide with selected free tertiary amines.

The art has recognized a concern in removing the sulfur dioxide contaminant from waste gases, in particular combustion gases such as, stack gases. Such gases generally contain low but objectionable concentrations of sulfur dioxide. Such gases, of course, contain other contaminants and chemicals which can interfere with any reaction selected for removing the sulfur dioxide.

A reaction of interest is the use of amines to form complexes with the sulfur dioxide. U.S. Pat. No. 2,928,836 generally teaches the formation of complexes between sulfur dioxide and a tertiary amine such as pyridine. U.S. Pat. No. 2,399,013 teaches that complexes are formed between sulfur dioxide and aromatic amines, and this patent further teaches that the complex can be liberated by application of heat. Similar general teachings may be found in U.S. Pat. No. 2,122,544.

It has been found that certain amines can be used to great advantage to remove sulfur dioxide from waste gases, even when present in very low concentrations, and even in the presence of carbon dioxide which could compete for the amines by way of formation of salts or complexes. Not only is the sulfur dioxide removed when present in such very low concentrations, but the removal is efficient to detectable zero levels.

One important object of the present invention is to provide a novel, low cost and efficient method for removing sulfur dioxide from waste gases; and to remove the sulfur dioxide continuously even though it is present in low concentrations. This object is served by advantageously forming a coordinate covalent complex of the sulfur dioxide and free selective tertiary amines.

Another particular object is to provide a method for removing sulfur dioxide from waste gases by reacting with a free tertiary amine complexing agent, even in the presence of carbon dioxide which is substantially unreactive with the selected tertiary amines, thereby not competing with the available free tertiary amine.

The practice of the invention now provides that waste combustion gases, such as stack gases, can be effectively contacted with selected tertiary amines which have basic strengths from about $1.4 \times 10^{-9}$ to $5.0 \times 10^{-4}$. Generally, it has been found that the tertiary amines should have basic strengths in excess of about pK 5. Tri-loweralkyl amines which have the required basic strengths include trimethylamine, triethylamine, and tri-n-butylamine. A tertiary amine such as pyridine, for example, has basic strength which is too low to achieve the success desired for efficiently removing sulfur dioxide from the waste gases.

The coordinate covalent complex is formed between the tertiary amine and sulfur dioxide as shown by the following designation:

$R_3N.SO_2$

The tertiary amine complexing agent donates an unshared electron pair to the sulfur atom.

The sulfur dioxide is present as an objectionable contaminant in waste gas streams, even though it occurs in very low concentrations, say, less than about one volume percent. The selected tertiary amines have sufficient basic strength to form a stable complex with the sulfur dioxide, to allow removal from the waste gas stream, but the complex has insufficient stability to resist thermal regeneration. Low levels of sulfur dioxide can be reduced, even as low as about 10 ppm. The complexing agents will remove such small amounts to zero detectable levels, by which is meant the use of methods now available which can detect the presence of sulfur dioxide in the 0–10 ppm range. Relatively modest regenerating temperatures are required to efficiently regenerate the complexing agent. A temperature of about 100° C. for a short time is sufficient to regenerate a complex formed with preferred tri-n-butylamine.

Carbon dioxide occurs in waste gases, particularly in stack gases. The presence of carbon dioxide creates the expectancy of competition with sulfur dioxide relative to reaction with the amine, to form a complex or a salt. This would reduce the effectiveness of the amine for removing sulfur dioxide by forming a coordinate covalent complex. Certain primary and secondary amines are well known stripping agents for carbon dioxide, therefore, establishing the view in the art that carbon dioxide is expected to participate in the reaction between sulfur dioxide and an amine. The use of the selected tertiary amines, in particular, tri-n-butylamine leads to important advantages in that sulfur dioxide is stripped from waste gases such as stack gas without reacting with the carbon dioxide present therein, to form a complex or a salt.

The small concentrations of sulfur dioxide in waste gases can be removed continuously by moving the waste gas through a complex formation zone which contains a selected tertiary amine. The waste gases then leave the complex formation zone with the sulfur dioxide being reduced to detectable zero levels. The formed sulfur dioxide and tertiary amine complex is then continuously removed from the complex formation zone to a regeneration zone where moderate heat is applied to liberate the sulfur dioxide from the complexing amine. The liberated sulfur dioxide is then removed from the regeneration zone as a gas stream to a collection point where the sulfur dioxide may be utilized in its collected form, or be used as a starting material to form sulfur derivatives. The residual gas, free of the sulfur dioxide and the complexing amine, is then continuously removed from the regeneration zone and is either combined with the waste gas leaving the complex formation zone, or is discharged independently. The regenerated complexing tertiary amine is reused by contacting the amine with new charges of waste gas stream, or by recycling the regenerated tertiary amine continuously to the waste gas stream before it is delivered to the complex formation zone.

The complexing tertiary amine is provided in the free form, that is, gaseous or anhydrous. The anhydrous form may be used to spray the waste gas stream. The waste stream may move through a spray chamber, for example, having a plurality of spaced spray heads to deliver the liquid, anhydrous tertiary amine.

The complexing liquid tertiary amine may also be in a liquid-film form, in which the waste gas stream makes contact with the film. The complexing liquid tertiary amine may also be mixed with a solvent such as dioxane. The solvent-amine mixture will then function not only to complex the $SO_2$, but the dioxane will be beneficial in removing another pollutant such as $SO_3$. Mixed amines may also be utilized wherein the desired tri-lower alkyl amines are combined with amines such as pyridine to complex other pollutants such as sulfur trioxide.

The following examples are presented to illustrate various embodiments of the invention, but it should be understood that none of such embodiments are intended to be representative of exclusive teachings.

EXAMPLE 1

Use of Tertiary Amines in a Liquid Scrubber

Three streams of sulfur dioxide were moved through a liquid scrubber. The first stream was pure sulfur dioxide, the second stream contained 1,000 ppm of sulfur dioxide in nitrogen; and the third stream contained three volume percent of sulfur dioxide in air. The complexing reaction of sulfur dioxide with the tertiary amine is exothermic, and a reaction was confirmed by visual observation and temperature recordation. The off-gas from the liquid scrubber was analyzed by methods sensitive for detecting sulfur dioxide in the 0–10 ppm range. Separate runs were made with the liquid scrubber containing pyridine, and then containing tri-n-butylamine.

Gas scrubbing was continued up to the saturation point which was determined by sulfur dioxide breakthrough. The amine was then de-gased by nitrogen purging in ambient temperature until sulfur dioxide could not be detected in the off-gas. This procedure removed any dissolved sulfur dioxide that was not complexed. After the amine is purged of the dissolved sulfur dioxide, the temperature is increased to slightly over 100° C. to decompose the complex, liberate the sulfur dioxide and to collect the amine. The temperature is held level when the sulfur dioxide liberation starts, and the scrubber is purged with nitrogen.

The visual observation and temperature determination established that pyridine was not an effective sulfur dioxide absurber, while anhydrous tri-n-butylamine was effective for this purpose. The basic strength of tri-n-butylamine is substantially greater than pyridine, $pK_a 11$ versus $pK_a 5$. In addition, the rate of coordination of the complex was higher for the more basic tertiary amine. The off-gas was about 0 ppm when using the tri-n-butylamine. Sulfur dioxide was removed from all three streams with the liquid tri-n-butylamine.

EXAMPLE 2

Effect of Carbon Dioxide in a Gas Stream

About 10 ml of concentrated anhydrous tri-n-butylamine (TBA) was placed in a test tube. Pure carbon dioxide gas was passed through the liquid TBA at a rate of about 140 ml/min. The temperature of effluent gas was monitored. No change in temperature occurred from the beginning to the end of the experiment, 30 minutes total. Also, there is no color change of the solution. The effluent gases were collected and analyzed on a gas chromatograph. The influent and effluent were basically the same, and the product gas was collected at the same rate as the feed gas was supplied. Thus, no uptake or reaction was detected.

EXAMPLE 3

Complexing with Tripropylamine

Concentrated sulfur dioxide is bubbled through 20 ml anhydrous tripropylamine and the color of the solution changes from clear to yellow to dark green with an increase in temperature to 76° C. The sulfur dioxide flow is then stopped and the body of liquid is purged with notrogen. This produces an immediate color change from green to yellow. The solution is then gradually heated to 125° C. at which time the solution turns clear indicating breakdown of the complex and removal of the sulfur dioxide no longer detected in the off-gas.

EXAMPLE 4

A flowing gas mixture containing 24 ml percent carbon dioxide, and 76 ml percent air, was scrubbed with a 50 percent water solution of triethanol amine, and anhydrous liquid-free triethanol amine to demonstrate the non-reactivity of the free amine form with present carbon dioxide. Such comparisons are shown in the following table:

| EXPERIMENTAL CONDITIONS AND RESULTS OF GAS-SCRUBBING | | | | | |
|---|---|---|---|---|---|
| Pressure-Ambient Temperature-Ambient Gas-24mol % $CO_2$, 66 mol % Air Apparatus-See FIG. 1 | | | | | |
| Scrubbing Liquid, ml | | Theoretical $CO_2$ | Gas Flow Rate | | Mol % $CO_2$ |
| Water[a] | Triethanolamine[a] | Capacity, ml[c] | Out, ml/min. | Time, min. | in Effluent Gas |
| 21 | 21 | 3544 | 3.80 | 26.75 | 7.3[d] |
| 21 | 21[b] | 3544 | 3.67 | 27.25 | 14.6[d] |
| 0 | 42 | 7088 | 3.19 | 180 | 22.6[e] |
| 0 | 42[b] | 7088 | 3.19 | 1140 | 23.0[e] |

[a]Water is deionized water; triethanolamine is J. T. Baker U.S.P., Lot 41053, No. 9467.
[b]Scrubbing liquid is same as one above it except that run continued for additional indicated time of 27.25 min. or 1140 min. and new gas sample taken.
[c]At 1:1 TEA:$CO_2$molar ratio.
[d]By gas chromatography of sample removed from gas burette that was filled during indicated time.
[e]By gas chromatography of sample removed from gas burette that was filled during the last 30 min. of indicated time.

It is seen from the above table that last two runs are made with the free amine, and that the mol% of $CO_2$ in the effluent gas is substantially the same as the mol% in the feed gas. This establishes that the $CO_2$ present in the feed gas is not reacted with the free amine, whereas it is reacted with the aqueous amine. It is noted that the contact time of the scrubbing liquid with the flowing gas was extended substantially in the case of the free amine, but still there was no substantial reaction with the $CO_2$ present in the flowing gas. It is further noted that the amount of $CO_2$ in the flowing gas does not exceed the capacity of the triethanol amine to absorb such gas, by a wide margin.

The claims of the invention are now presented, and the terms of such claims may be better understood by reference to the language of the foregoing specification.

What is claimed is:

1. A method for removing sulfur dioxide from waste gases which may have low concentrations of sulfur dioxide and wherein said waste gas includes carbon dioxide, which includes the steps of:

contacting a waste gas stream with a free tertiary amine which is not in water solution, said tertiary amine having a basic strength of greater than $pK_a5$ to collect the sulfur dioxide as a coordinate covalent complex which is sufficiently stable to be removed from the waste gas and thereby to reduce the sulfur dioxide content to detectable zero levels, said free tertiary amine characterized in being substantially unreactive with any present carbon dioxide, and being further characterized by the carbon dioxide being unreactive with the tertiary amine so as not to reduce the absorptive capacity of the tertiary amine relative to the sulfur dioxide, thermally treating the coordinate covalent complex which is unstable to thermal regeneration temperatures, collecting a stream of liberated sulfur dioxide, and recovering the regenerated tertiary amine for subsequent contact with a waste gas stream containing sulfur dioxide.

2. A method which includes the steps of claim 1 wherein the tertiary amine is tri-n-butylamine.

3. A method which includes the steps of claim 1 wherein the waste gas stream contains carbon dioxide and low concentrations of sulfur dioxide of less than about one volume percent, and wherein said tertiary amine is tri-n-butylamine.

* * * * *